United States Patent Office 3,629,208
Patented Dec. 21, 1971

---

3,629,208
N-AMINOALKYL THIAZOLESULFENAMIDES AS VULCANIZATION ACCELERATORS
John Joseph D'Amico, Akron, and Darrell Dexter Mullins, Norton, Ohio, assignors to Monsanto Company, St. Louis, Mo.
No Drawing. Filed June 18, 1969, Ser. No. 834,513
Int. Cl. C08f 27/06, 45/60
U.S. Cl. 260—79.5 B
9 Claims

ABSTRACT OF THE DISCLOSURE

Benzothiazolyl sulfenamides having the formula

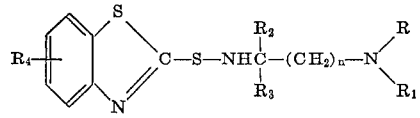

wherein R is hydrogen or lower alkyl, $R_1$ is lower alkyl, cycloalkyl, aralkyl, unsubstituted aryl, aryl substituted by alkyl, hydroxy, arylamino, alkoxy, chloro, fluoro, bromo or iodo or

together form a heterocyclic ring or substituted heterocyclic ring where the substituent is alkyl or benzothiazolylthio, $R_2$ is hydrogen, lower alkyl,

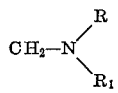

where

is the same as above, $R_3$ is hydrogen, lower alkyl or taken together with the carbon to which they are attached $R_2$ and $R_3$ represent lower cycloalkyl of four to eight carbon atoms, $R_4$ is hydrogen, lower alkyl, alkoxy, nitro, phenyl, chloro, fluoro, bromo, iodo, and $n$ is one or two, which sulfenamides accelerate the vulcanization of rubber.

FIELD OF THE INVENTION

This invention relates to the curing of sulfur-vulcanizable rubber, especially to the use of accelerators to achieve rapid cure rates and excellent physical properties of the vulcanizates. More specifically, this invention relates to new delayed-action sulfenamide accelerators and their use in sulfur vulcanization of elastomers. Also, it relates to the stabilization of rubber vulcanizates since some of the compounds of this invention provide protection from ozone degradation of the vulcanizate.

BACKGROUND OF THE INVENTION

The principal process for vulcanizing rubbers is heating them with sulfur. Sulfur vulcanization in the absence of an accelerator requires cure times of hours compared to minutes when used with an accelerator. Accelerators, therefore, are of great economic importance to a rubber goods manufacturer since they greatly increase his productivity. Historically, organic amines, such as hexamethylenetetramines, were widely used as accelerators. Although the organic amines did greatly improve cure rates, there were disadvantages to their use. Their primary source of difficulty was that they were "scorchy." "Scorch" is premature vulcanization, meaning the stock becomes partly vulcanized before the product is in final form and ready to be vulcanized. The scroch problem arises because mixing the ingredients of the stock causes heat build-up and also in some manufacturing operations the stocks are stored before vulcanization during which time premature vulcanization may occur. When scorch occurs the stock becomes useless and must be discarded. The scorch problem with organic amines has been greatly reduced by the introduction of delayed-action accelerators of the sulfenamide type. The sulfenamide accelerators are called "delayed-action" because they have fast cure rates, yet are not as susceptible to premature vulcanization. As a result, the non "scorchy" sulfenamide accelerators have found wide use in the rubber processing industry.

Although the new sulfenamide accelerators of this invention are organic amines as well as amides, they are delayed-action accelerators. The compounds impart a rapid cure rate to sulfur-vulcanizable diene rubber stocks, yet have processing safety and produce vulcanizates having excellent physical properties. Another advantage of these compounds is that they may be economically produced by simple methods described below from inexpensive reactants. Rubber containing certain compounds of this invention is protected from ozone attack. These and other advantages shall become apparent as the description of the invention proceeds.

SUMMARY OF THE INVENTION

In accordance with this invention certain N-aminoalkyl thiazole sulfenamides have been found which are valuable delayed-action accelerators in the vulcanization of elastomers. More specifically, the N-aminoalkyl thiazole sulfenamides of this invention are compounds of the formula

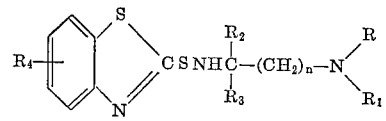

wherein R is hydrogen or lower alkyl preferably of 1 to 8 carbon atoms, $R_1$ is lower alkyl, cycloalkyl, aralkyl, unsubstituted aryl, aryl substituted by alkyl, hydroxy, arylamino, alkoxy, chloro, fluoro, bromo, or iodo, or

together form an unsubstituted heterocyclic ring or heterocyclic ring substituted by alkyl or

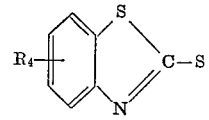

$R_2$ is hydrogen, lower alkyl, or

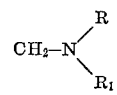

where

is the same as above, $R_3$ is hydrogen, lower alkyl or taken together with the carbon to which they are attached $R_2$ and $R_3$ represent lower cycloalkyl of four to eight carbon atoms but $R_2$ and $R_3$ are preferably lower alkyl, $R_4$ is hydrogen, lower alkyl, alkoxy, nitro, phenyl, chloro, fluoro, bromo, or iodo, and $n$ is one or two, preferably one.

Typical examples of the invention are:

N-(2-methylamino-1,1-dimethylethyl)-2-benzothiazole-
sulfenamide,
N-(2-isopropylamino-1,1-dimethylethyl)-2-benzothiazole-
sulfenamide,
N-(2-butylamino-1,1-dimethylethyl)-2-benzothiazole-
sulfenamide,
N-[2-(1-methylpropylamino)-1,1-dimethylethyl]-2-
benzothiazolesulfenamide,
N-(2-isopropylamino-1-methyl-1-ethyl ethyl)-2-
benzothiazolesulfenamide,
N-(2-benzylamino-1,1-dimethylethyl)-2-benzothiazole-
sulfenamide,
N-(2-alpha-methyl benzylamino-1,1-dimethylethyl)-2-
benzothiazolesulfenamide,
N-(2-dimethylamino-1,1-dimethylethyl)-2-benzotriazole-
sulfenamide,
N-(2-dimethylamino-1-methyl-1-ethyl ethyl)-2-benzothia-
zolesulfenamide,
N-(2-dibutylamino-1,1-dimethylethyl)-2-benzothiazole-
sulfenamide,
N-(2-bis(2-ethylhexyl)amino-1,1-dimethylethyl)-2-
benzothiazolesulfenamide,
N-[1,1-dimethyl-2(2,5-dimethylpyrroldinylethyl)]-
2-benzothiazolesulfenamide,
N-[2-(2,4-dimethylanilino)-1,1-dimethylethyl]-2-
benzothiazolesulfenamide,
N-[2-(3-methylanilino)-1,1-dimethylethyl]-2-benzothi-
azolesulfenamide,
N-[2-(o-chloroanilino-1,1-dimethylethyl[-2-
benzothiazolesulfenamide,
N[2-(m-chloroanilino)-1,1-dimethylethyl]-2-
benzothiazolesulfenamide,
N-(2-anilino-1-methyl-1-anilinomethyl ethyl)-2-
benzothiazolesulfenamide,
N-[2-(butylamino)-1-methyl-1-butylaminomethyl-
ethyl]-2-benzothiazolesulfenamide,
N-(2-isopropylamino-1-isopropylaminomethyl-1-ethyl
ethyl)-2-benzothiazolesulfenamide,
N-(2-isopropylamino-1-isopropylaminomethyl-1-
methylethyl)-2-benzothiazolesulfenamide,
N-(2-anilino-1,1-dimethylethyl)-2-benzothiozole-
sulfenamide,
N-[2-(2-methylanilino)-1,1-dimethylethyl]-2-benzo-
thiazolesulfenamide,
N-(2-p-methylanilino1,1-dimethylethyl)-2-benzo-
thiazolesulfenamide,
N-[2-(N-methylanilino)-1,1-dimethylethyl]-2-benzo-
thiazolesulfenamide,
N-(2-p-fluoroanilino-1,1-dimethylethyl)-2-benzo-
thiazolesulfenamide,
N-(2-o-fluoroanilino-1,1-dimethylethyl)-2-benzothiazole-
sulfenamide,
N-[2-(hexahydro-1H-azepin-1-yl)-1,1-dimethylethyl]-2-
benzothiazolesulfenamide,
N-(2-morpholino-1,1-dimethylethyl)-2-benzothiazole-
sulfenamide,
N-[2-(3-azabicyclo[3.2.2]non-3-yl)-1,1-dimethyl-
ethyl]-2-benzothiazolesulfenamide,
N-(2-phenetidino-1,1-dimethylethyl)-2-benzothiazole-
sulfenamide,
N-[2-(p-chloroanilino)-1,1-dimethylethyl]-2-benzo-
thiazolesulfenamide,
N-(1,1-dimethyl-2-piperidinoethyl)-2-benzothiazole-
sulfenamide,
N-(1,1-dimethyl-2-pyrrolidinylethyl)-2-benzothiazole-
sulfenamide,
N-[2-(cis and trans 2,6-dimethylmorpholino)-1,1-di-
methylethyl]-2-benzothiazolesulfenamide,
N-[1-(p-anilinoanilinomethyl)cyclohexyl]-2-benzo-
thiazolesulfenamide,
N-(2-anilinoethyl)-2-benzothiazolesulfenamide,
N-[2-(4-[2-benzothiazolylthio]piperanzin-1-yl)ethyl]-
2-benzothiazolesulfenamide,
N-(3-morpholinopropyl)-2-benzothiazolesulfenamide,
N-(2-moropholino-1,1-dimethylethyl)-2-(6-ethoxy-
benzothiazole)sulfenamide,
N-(2-morpholino-1,1-dimethylethyl)-2-(5-chloro-
benzothiazole)sulfenamide,
N-(2-morpholino-1,1-dimethylethyl)-2-(6-methyl-
benzothiazole)sulfenamide,
N-(2-morpholino-1,1-dimethylethyl)-2-(4-phenyl-
benzothiazole)sulfenamide,
N-(2-moropholino-1,1-dimethylethyl-2-(nitrobenzo-
thiazole)sulfenamide,
N-(2-anilino-1,1-dimethylethyl)-2-(6-ethoxybenzo-
thiazole)sulfenamide,
N-(2-anilino-1,1-dimethylethyl)-2-(5-chlorobenzothia-
zole)sulfenamide,
N-(2-anilino-1,1-dimethylethyl)-2-(6-methyl-
benzothiazole)sulfenamide,
N-(2-anilino-1,1-dimethylethyl)-2-(4-phenylbenzo-
thiazole)sulfenamide,
N-(2-anilino-1,1-dimethylethyl)-2-nitrobenzothiazole)
sulfenamide,
N-[2-(p-anilinoanilinomethyl)-1,1-dimethylethyl]-2-
benzothiazolesulfenamide,
N-[2-(p-cyclohexylaminoanilinomethyl)-1,1-dimethyl-
ethyl]-2-benzothiazolesulfenamide,
N-[2-(p-sec. hexylaminoanilinomethyl)-1,1-dimethyl-
ethyl]-2-benzothiazolesulfenamide,
N-[2-(p-sec. heptylaminoanilinomethyl)-1,1-dimethyl-
ethyl]-2-benzothiazolesulfenamide,
N-[2-(p-isopropylaminoanilinomethyl)-1,1-dimethyl-
ethyl]-2-benzothiazolesulfenamide.

DESCRIPTION OF THE PREFERRED
EMBODIMENTS

The compounds of this invention are prepared by oxidative condensation of a mercaptobenzothiazole or disulfide thereof with the N-(aminoalkyl)amine or by other methods known for the preparation of thiazolesulfenamides. The preferred method of preparation is by reaction of 2-benzothiazolesulfenamide, with N-(amino-alkyl)amine. The amines used to prepare the compounds of this invention are obtained commercially or are prepared by the methods of H. G. Johnson, J. Am. Chem. Soc. 68, 12–18 (1946), or M. Senkus, J. Am. Chem. Soc. 68, 10–12 (1946). The preparation and properties of the new compounds of this invention are described in greater detail below.

Example 1

N-(2-anilino-1,1-dimethylethyl)-2-benzothiazolesulfenamide is prepared in the following manner. A mixture containing 56.4 grams (0.3 mole) of 2-benzothiazole-sulfenamide and 65.7 grams (0.4 mole) of N-(2-amino) 2-methylpropylaniline in 600 ml. of isopropyl alcohol is heated with stirring. A clear solution is obtained between 50°–65° C. The reaction mixture is then heated at reflux (80°–83° C.) for 3 hours during which time ammonia is evolved. The solution is filtered hot to remove any impurities. The reaction mixture is allowed to cool to 10° C. at which time 1500 grams of ice water is slowly added. The mixture is then stirred for one hour between 0–10° C. The solid which forms is recovered by filtration, washed with water until neutral and air dried at 25°–30° C. The product weight 95 grams (96% yield). The product recrystallized from heptane melts at 98°–99° C. Analysis of the product gives 12.35% nitrogen and 19.70% sulfur compared to 12.75% nitrogren and 19.47% sulfur calculated for $C_{17}H_{19}N_3S_2$.

Example 2

The following 2-benzothiazolesulfenamides are prepaired in a manner analogous to Example 1.

N-(2-morpholino-1,1-dimethylethyl)-2-benzothiazole-sulfenamide.—The amine used is N-(2-amino-2-methylpropyl)morpholine. 96 grams (99% yield) of product are recovered. The melting point of the product recrystallized from heptane is 95°–96° C. Analysis of the product is 12.82% nitrogren and 20.15% sulfur compared to 12.99% nitrogen and 19.83% sulfur calculated for $C_{15}H_{21}N_3OS_2$.

N - [2 - (2 - methylanilino) - 1,1 - dimethylethyl] - 2-benzothiazolesulfenamide.—The amine reactant is N-[(2-amino-2-methyl)propyl]-o-methylaniline. 73 grams (90% yield) of product are obtained. The melting point after recrystallization from ethyl alcohol is 138°–139° C. Analysis of the product is 11.93% nitrogen and 18.90% sulfur compared to 12.23% nitrogen and 18.67% sulfur calculated for $C_{18}H_{21}N_3S_2$.

N - [2 - (hexahydro-1H-azepin-1-yl) - 1,1 - dimethylethyl]-2-benzothiazolesulfenamide.—The amine used is N-[(2-amino - 2 - methyl)propyl]hexamethyleneamine. 84 grams (84% yield) of a solid are obtained. Recrystallized from ethyl alcohol, the solid melts at 85°–87° C. Analysis of the product gives 12.25% nitrogen and 19.44% sulfur compared to 12.52% nitrogen and 19.11% sulfur calculated for $C_{17}H_{25}N_3S_2$.

N-[2 - (3-azabicyclo[3.2.2]non-3-yl) - 1,1 - dimethylethyl]-2-benzothiazolesulfenamide.—The amine reactant is N-[(2-amino-2-methyl)propyl]-3-azabicyclo[3.2.2]nonane. 102 grams (94% yield) of product are obtained. Recrystallized with ethyl alcohol, the melting point is 166°–167° C. Analysis of the product gives 11.82% nitrogen and 17.42% sulfur compared to 11.63% nitrogen and 17.74% sulfur calculated for $C_{19}H_{27}N_3S_2$.

N-[2 - (cis and trans-2,6-dimethylmorpholino)-1,1-dimethylethyl] - 2 - benzothiazolesulfenamide.—The amine used is N-[(2-amino-2-methyl)propyl]cis and trans-2,6-dimethylmorpholine. 105 grams (100% yield) of a solid are obtained. Recrystallized from heptane, the solid melts at 101°–102° C. Analysis of the product gives 11.55% nitrogen and 18.26% sulfur compared to 11.95% nitrogen and 18.24% sulfur calculated for $C_{17}H_{25}N_3OS_2$.

N-(1,1-dimethyl-2-piperidinoethyl) - 2 - benzothiazolesulfenamide.—The amine reactant is N-[(2-amino-2-methyl)propyl]-piperidine. 60 grams (62% yield) of a solid are obtained. The product recrystallized from ethyl alcohol melts at 82°–83° C. Analysis of the new sulfenamide gives 13.28% nitrogen and 19.90% sulfur compared to 13.07% nitrogen and 19.95% sulfur calculated for $C_{16}H_{23}N_3S_2$.

N-(2-phenetidino-1,1-dimethylethyl) - 2 - benzothiazolesulfenamide.—The amine used is N-[(2-amino-2-methyl)-propyl]phenetidine. 52 grams (70% yield) of a solid are obtained. Recrystallized from heptane, the product melts at 88°–89° C. Analysis of the product gives 11.12% nitrogen and 17.35% sulfur compared to 11.31% nitrogen and 17.26% sulfur calculated for $C_{19}H_{23}N_3OS_2$.

N-[1-(p-anilinoanilinomethyl)cyclohexyl] - 2 - benzothiazolesulfenamide.—The amine reactant is 1-(p-anilinoanilinomethyl)-cyclohexylamine. A solid (77% yield) is obtained. After two recrystallizations with ethyl alcohol, the product melts at 170°–172° C. Analysis of the product gives 11.91% nitrogen and 13.69% sulfur compared to 12.16% nitrogen and 13.92% sulfur calculated for $C_{26}H_{28}N_4S_2$.

N-(2 - anilinoethyl)-2-benzothiazolesulfenamide.—The amine used is N-phenylethylenediamine. 75 grams (83% yield) of a solid is recovered. Recrystallized from ethyl alcohol, the product melting point is 89°–90° C. Analysis of the product gives 13.62% nitrogen and 21.20% sulfur compared to 13.95% nitrogen and 21.28% sulfur calculated for $C_{15}H_{15}N_3S_2$.

N-[2 - (4 - [2-benzothiazolythio]piperazin-1-yl)ethyl]-2-benzothiazolesulfenamide.—The amine used in N-2-aminoethyl piperazine (0.17 mole). 55 grams (79% yield) of solid are obtained. Recrystallized from a mixture of ethyl acetate and ethyl alcohol, the solid melts at 122.5°–123.5° C. Analysis of the product gives 15.21% nitrogen and 28.11% sulfur compared to 15.24% nitrogen and 27.90% sulfur calculated for $C_{20}H_{21}N_5S_4$.

Example 3

N-[2-(N-methylanilino)-1,1-dimethylethyl] - 2 - benzothiazolesulfenamide is prepared in the following manner. 56.4 grams (0.3 mole) of 2-benzothiazolesulfenamide and 71.3 grams (0.4 mole) of N-[(2-amino-2-methyl)propyl]-N-methylaniline is mixed in 600 ml. of isopropyl alcohol. The reaction mixture is heated with stirring with solution at 57°–58° C. The solution is refluxed for three hours. Evolution of ammonia occurs during this period. The solution is filtered hot and the filtrate is cooled to 10° C. 800 ml. of water and 1000 ml. of ethyl ether is added to the cooled filtrate. The mixture is stirred for one-half hour at 25°–30° C. The mixture is filtered to remove impurities. The ether layer is separated and washed with water until neutral. The ether solution is dried over anhydrous sodium sulfate. The ether is removed under vacuum at maximum 45°–50° C. at 1–2 mm Hg. 102 grams (99% yield) of a viscous liquid is obtained which upon standing solidifies. The solid is recrystallized from ethyl alcohol, M.P. 90°–91° C. Analysis of the product gives 12.33% nitrogen and 18.40% sulfur compared to 12.23% nitrogen and 18.67% sulfur calculated for $C_{18}H_{21}N_3S_2$.

Example 4

The following new 2-benzothiazolesulfenamides are prepared in a manner similar to Example 3.

N-[2-(p-chloroanilino)-1,1-dimethylethyl] - 2 - benzothiazolesulfenamide.—The amine reactant is N-[2-(amino-2-methyl)propyl]-p-chloroaniline. 68 grams (94% yield) of a very viscous liquid are recovered. Analysis of the product gives 11.42% nitrogen and 9.95% chlorine compared to 11.55% nitrogen and 9.74% chlorine calculated for $C_{17}H_{18}ClN_3S_2$.

N-[2-(p-fluoroanilino)-1,1-dimethylethyl] - 2 - benzothiazolesulfenamide.—The amine used is N-[2-(amino-2-methyl)propyl]-p-fluoroaniline. 86 grams (83% yield) of a solid are obtained. After recrystallization from ethyl alcohol, the product has a melting point of 82°–83° C. Analysis of the product gives 11.90% nitrogen and 18.50% sulfur compared to 12.09% nitrogen and 18.46% sulfur calculated for $C_{17}H_{18}FN_3S_2$.

N-[2-(o-fluoroanilino)-1,1-dimethylethyl] - 2 - benzothiazolesulfenamide.—N-[(2-amino-2-methyl)propyl] - o-fluoroaniline is the amine reactant. 98 grams (94% yield) of a viscous liquid which solidifies upon standing are obtained. Recrystallized from ethyl alcohol, the solid product melts at 64°–65° C. Analysis of the product gives 11.89% nitrogen and 18.04% sulfur compared to 12.09% nitrogen and 18.46% sulfur calculated for $C_{17}H_{18}FN_3S_2$.

N-[2-(p-methylanilino)-1,1-dimethylethyl] - 2 - benzothiazolesulfenamide.—The amine used is N-[(2-amino-2-methyl)propyl]-p-methylaniline. 97 grams (95% yield) of a solid are obtained. The melting point after recrystallization from ethyl alcohol is 101°–102° C. Analysis of the product gives 11.78% nitrogen and 18.20% sulfur compared to 12.23% nitrogen and 18.67% sulfur calculated for $C_{18}H_{21}N_3S_2$.

N-(1,1-dimethyl-2-pyrrolidinylethyl)-2 - benzothiazolesulfenamide.—The amine reactant is N-(2-amino-2-methyl)propylpyrrolidine. 54 grams (55% yield) of a viscous liquid are recovered. Analysis of the product gives 12.89% nitrogen and 20.94% sulfur compared to 13.67% nitrogen and 20.86% sulfur calculated for $C_{15}H_{21}N_3S_2$.

N-(3-morpholinopropyl)-2-benzothiazolesulfenamide.—The amine reactant is N-(3-aminopropyl)morpholine. 54 grams (55% yield) of a viscous liquid is obtained. Analysis of the product gives 13.21% nitrogen and 20.97% sulfur compared to 13.58% nitrogen and 20.72% sulfur calculated for $C_{14}H_{19}N_3OS_2$.

The new compounds can be used as accelerators in the vulcanization of natural and synthetic sulfur-vulcanizable rubbers. Synthetic rubbers that can be vulcanized with sulfur include the diene rubbers examples of which are polymers of 1,3-butadienes, for example, of 1,3-butadiene itself and of isoprene, copolymers of 1,3-butadienes with other monomers, for example, styrene, acrylonitrile, isobutylene or methyl methacrylate, and polyolefin rubbers for example ethylene-propylene terpolymers (EPDM). EPDM rubber and butyl rubber illustrate suitable diene rubbers of low unsaturation.

The amount of accelerator used depends on a number of factors such as process conditions, type of elastomer, use of the vulcanized product, other components in the recipe and other variables to which the compounder must address himself. The amount is, however, usually within the range of 0.1 to 5 parts by weight, and more often within the range of 0.3 to 2 parts by weight per 100 parts by weight of rubber. The preferred usage generally falls within the range of 0.5 and 1.5 parts by weight accelerator.

As examples of the accelerating activity of the compounds of this invention, vulcanizable compositions are compounded comprising:

| STOCK A | Parts |
|---|---|
| Natural rubber | 100.0 |
| High abrasion furnace black | 50.0 |
| Sufur | 2.0 |
| Zinc oxide | 5.0 |
| Stearic acid | 3.0 |
| Hydrocarbon softener | 3.0 |
| Santoflex 13 | 2.0 |
| Accelerator | 0.5 |
| Total | 165.5 |

| STOCK B | |
|---|---|
| Styrene butadiene copolymer rubber | 100.0 |
| High abrasion furnace black | 50.0 |
| Sulfur | 1.75 |
| Zinc oxide | 4.0 |
| Stearic acid | 2.0 |
| Hydrocarbon softener | 10.0 |
| Santoflex 13 | 2.0 |
| Accelerator | 1.0 |
| Total | 170.75 |

All stocks contain an antidegradant, Santoflex 13, which is N-(1,3-dimethylbutyl)-N'-phenyl-p-phenylenediamine. For all the rubber stocks tested and described as illustrative of the invention, Mooney scorch times at 135° C. are determined by means of a Mooney Plastometer. The time in minutes ($t_5$) required for the Mooney reading to rise five points above the minimum viscosity is recorded. Longer times are indicative of greater processing safety. The stocks are cured for the length of time required to obtain the optimum cure. The cure temperature is 144° C. in the case of Stock A; and the cure temperature is 153° C. in the case of Stock B. Curing characteristics are determined by means of the Monsanto Oscillating Disc Rheometer described by Decker, Wise, and Guerry in Rubber World, December 1962, page 68. From the Rheometer data the time to optimum cure is determined and the stocks are cured in a press for that time. The ultimate tensile strength and modulus at 300 percent elongation is determined for each vulcanizate.

The properties obtained for rubber compositions comprising the compounds of this invention are shown in Table I.

TABLE I

| Accelerator | Mooney scorch time, $t_5$ | | Modulus at 300% elongation | | Ultimate tensile strength | |
|---|---|---|---|---|---|---|
| | Stock A | Stock B | Stock A | Stock B | Stock A | Stock B |
| 1 | 10.8 | 25.8 | 2,480 | 1,740 | 4,300 | 3,500 |
| 2 | 11.7 | 29.8 | 2,440 | 1,750 | 4,200 | 3,400 |
| 3 | 10.6 | 26.7 | 2,550 | 1,700 | 4,200 | 3,300 |
| 4 | 11.1 | 30.5 | 2,480 | 1,680 | 3,900 | 3,500 |
| 5 | 11.3 | 27.2 | 2,300 | 1,840 | 4,100 | 3,400 |
| 6 | 12.4 | 33.6 | 2,460 | 1,670 | 4,200 | 3,400 |
| 7 | 6.8 | 14.9 | 2,600 | 1,790 | 4,200 | 3,600 |
| 8 | 10.5 | 23.8 | 2,530 | 1,860 | 4,200 | 3,600 |
| 9 | 8.8 | 21.8 | 2,530 | 1,750 | 4,100 | 3,500 |
| 10 | 10.8 | 26.5 | 2,390 | 1,870 | 4,000 | 3,400 |
| 11 | 12.4 | 38.1 | 2,200 | 1,860 | 3,500 | 3,100 |
| 12 | 8.1 | 19.3 | 2,350 | 1,900 | 3,800 | 3,200 |
| 13 | 9.4 | 22.7 | 2,320 | 1,950 | 3,900 | 3,200 |
| 14 | *27.6 | 27.2 | 2,570 | 1,850 | 4,100 | 3,400 |
| 15 | 11.1 | 16.0 | 2,030 | 1,550 | 3,300 | 2,100 |
| 16 | 8.1 | 20.4 | 2,130 | 1,830 | 3,400 | 3,500 |
| 17 | 9.3 | 24.4 | 2,300 | 1,970 | 3,700 | 3,600 |
| 18 | 5.9 | 53.8 | 2,090 | 1,130 | 3,600 | 2,600 |

*Mooney Scorch at 121° C.

| Compound | Accelerators in the stocks |
|---|---|
| 1 | N-(2-anilino-1,1-dimethylethyl)-2-benzothiazolesulfenamide. |
| 2 | N-[2-(2-methylanilino)-1,1-dimethylethyl]-2-benzothiazolesulfenamide. |
| 3 | N-(2-p-methylanilino-1,1-dimethylethyl)-2-benzothiazolesulfenamide. |
| 4 | N-[2-(N-methylanilino)-1,1-dimethylethyl]-2-benzothiazolesulfenamide. |
| 5 | N-(2-p-fluoroanilino-1,1-dimethylethyl)-2-benzothiazolesulfenamide. |
| 6 | N-(2-o-fluoroanilino-1,1-dimethylethyl)-2-benzothiazolesulfenamide. |
| 7 | N-[2-(hexahydro-1H-azepin-1-yl)-1,1-dimethylethyl]-2-benzothiazolesulfenamide. |
| 8 | N-(2-morpholino-1,1-dimethylethyl)-2-benzothiazolesulfenamide. |
| 9 | N-[2-(3-azabicyclo[3.2.2]non-3-yl)-1,1-dimethylethyl]-2-benzothiazolesulfenamide. |
| 10 | N-(2-phenetidino-1,1-dimethylethyl)-2-benzothiazolesulfenamide. |
| 11 | N-[2-(p-chloroanilino)-1,1-dimethylethyl]-2-benzothiazolesulfenamide. |
| 12 | N-(1,1-dimethyl-2-piperidinoethyl)-2-benzothiazolesulfenamide. |
| 13 | N-(1,1-dimethyl-2-pyrrolidinylethyl)-2-benzothiazolesulfenamide. |
| 14 | N-[2(cis and trans-2,6-dimethylmorpholino)-1,1-dimethylethyl]-2-benzothiazolesulfenamide. |
| 15 | -[1-(p-anilinoanilinomethyl)cyclohexyl]-2-benzothiazolesulfenamide. |
| 16 | N-(2-anilinoethyl)-2-benzothiazolesulfenamide. |
| 17 | N-[2-(4-[2-benzothiazolylthio]piperazin-1-yl)ethyl]-2-benzothiazolesulfenamide. |
| 18 | N-(3-morpholinopropyl)-2-benzothiazolesulfenamide. |

The data in Table I show that the vulcanizates of either natural or synthetic rubber made using the compounds of this invention possess excellent modudli and tensile strength. The sub group which comprise the N-(2-amino - 1,1 - dimethylethyl)-2-benzothiazolesulfenamides possess superior delayed-action accelerator properties in the vulcanization of diene rubber. They yield rubber compositions of superior processing safety and are preferred.

N - alkyl - N'-phenyl-p-phenylenediamines have been known and used as antidegradants for rubber for some time. A p-phenylenediamine has been reacted to become a part of the molecule of the benzothiazolesulfenamide of this invention. The combination of a sulfenamide accelerator and p-phenylenediamine into one molecule has resulted in a type of compound which exhibits both accelerating and antidegradant properties. The advantages of an accelerator and antidegradant both can thereby be achieved by a single addition of the compound of this invention to a sulfur-vulcanizable rubber. Upon vulcanization, the cure rate is accelerated and thereafter the vulcanizate so produced is protected from degradation.

The use of N-[1-(p-anilinoanilinomethyl)cyclohexyl]-2-benzothiazolesulfenamide as an antioxidant and antiozonant is demonstrated below. The compound is incorporated into rubber stocks using the following recipes.

| Ingredient | Parts by weight | | | |
| --- | --- | --- | --- | --- |
| | Stock C | Stock D | Stock E | Stock F |
| Natural rubber (smoked sheets) | 100.0 | 100.0 | | |
| Styrene butadiene copolymer rubber | | | 100.0 | 100.0 |
| High abrasion furnace black | 50.0 | 50.0 | 50.0 | 50.0 |
| Sulfur | 1.75 | 1.75 | 1.75 | 1.75 |
| Zinc oxide | 5.0 | 5.0 | 4.0 | 4.0 |
| Stearic acid | 3.0 | 3.0 | 2.0 | 2.0 |
| Hydrocarbon softener | 3.0 | 3.0 | 10.0 | 10.0 |
| N-tert-butyl-2-benzothiazolesulfenamide | 0.5 | 0.5 | 1.0 | 1.0 |
| Antidegradant-N-[1-(p-anilinoanilinomethyl)cyclohexyl]-2-benzothiazolesulfenamide | 2.0 | | 2.0 | |

The cure temperature for Stock C and Stock D is 144° C. and Stock E and Stock F is 153° C. The stocks are cured to optimum cure. The stocks containing no antidegradant were used as controls to compare the aging characteristics of the vulcanizates.

Rubber specimens of Stock C and Stock D both gave initial ultimate tensile strength values of 3800 p.s.i. After aging one day at 100° C. in air Stock C had an ultimate tensile strength of 2200 p.s.i. compared to the Stock D which had an ultimate tensile strength of 1700 p.s.i. This result is indicative that the stock containing the antidegradant of this invention experienced less oxidation than the unprotected stock. The protected rubber has 30% more tensile strength than the unprotected rubber.

Rubber ozone resistance data for the vulcanizates are reported in Table II. The method used for measuring the ozone damage to vulcanized rubber is described by Decker and Wise, "The Stress Relaxation Method for Measuring Ozone Cracking," Rubber World, April 1962, page 66. The test specimens are placed in an oven where a controlled atmosphere of ozone is maintained. In the static test, the test specimens are held stationary under a given strain. In the dynamic test, the test specimens are flexed repeatedly to a 25% strain. The test specimens of rubber are two inch long T–50 (ASTM D599–55) pieces died from standard stress-strain test sheets (ASTM D15–57T).

The stress-relaxation method is based on the principle that the effective cross-sectional area of a small test piece of rubber is reduced by ozone cracking. The extent of cracking in a test piece is determined by measuring the forces required to extend the test piece 100% before and after exposure to ozone. As the strip begins to crack, the number of stress-supporting rubber chains decreases, and the force required to extend the strip 100% is reduced. The ratio of this force to the original force is calculated at various intervals of exposure to ozone. The graph of force vs. time is essentially a straight line, and the time required for attaining 90%, 80%, and 70% of the original force is readily determined from the graph. The ability of the rubber to resist ozone attack is obtained by comparison of these numbers. These ratios are the percent of original modulus of the rubber test piece and are listed as percent retention in the table, infra. The ozone concentration for the tests is 25 parts ozone per hundred million parts of air. Longer times in the data demonstate better ozone resistance of the rubber stock.

TABLE II

| | Stock | | | |
| --- | --- | --- | --- | --- |
| | C | D | E | F |
| Dynamic ozone resistance: | | | | |
| 90% retention | 14 | 10 | 7 | 3 |
| 80% retention | 33 | 20 | 12 | 9 |
| 70% retention | 90 | 39 | 22 | 14 |

Table II illustrates that vulcanizates containing the compound of this invention are more resistant to ozone degradation than unprotected vulcanizates.

Although the invention has been illustrated by typical examples, it is not limited thereto. Changes and modifications of the examples of the invention herein chosen for purposes of disclosure can be made which do not constitute departure from the spirit and scope of the invention.

What is claimed is:

1. A process for vulcanizing a sulfur-vulcanizable rubber which comprises:

mixing the rubber with a sulfur-containing vulcanizing agent and an accelerating amount of an accelerator of the formula

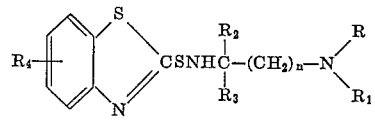

wherein R is hydrogen or lower alkyl, $R_1$ is lower alkyl, cycloalkyl, aralkyl, unsubstituted aryl, aryl substituted by alkyl, hydroxy, arylamino, alkoxy, chloro, fluoro, bromo or iodo; or wherein

together form an unsubstituted heterocyclic ring or heterocyclic ring substituted by alkyl or

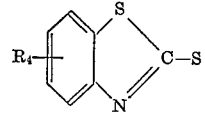

$R_2$ is hydrogen, lower alkyl, or

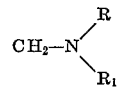

where

is the same as above, $R_3$ is hydrogen, lower alkyl or taken together with the carbon to which they are attached $R_2$ and $R_3$ represent lower cycloalkyl of four to eight carbon atoms, $R_4$ is hydrogen, lower alkyl, alkoxy, nitro, phenyl, chloro, fluoro, bromo or iodo, and $n$ is one or two, and heating the mixture at a vulcanizing temperature.

2. A process according to claim 1 wherein $R_2$ and $R_3$ are lower alkyl and $n$ is one.

3. A process according to claim 1 wherein R is hydrogen, $R_1$ is tolyl, $R_2$ and $R_3$ are lower alkyl and $n$ is one.

4. A process according to claim 1 wherein R is hydrogen, $R_1$ is 4-phenylaminophenyl and $n$ is one.

5. A process according to claim 1 wherein

is a heterocycle and $R_2$ and $R_3$ are lower alkyl.

6. A process according to claim 5 wherein

is morpholinyl.

7. A process according to claim 1 wherein R is hydrogen, $R_1$ is phenyl, $R_2$ and $R_3$ are methyl, $R_4$ is hydrogen and $n$ is one.

8. A process according to claim 1 wherein R is methyl, $R_1$ is phenyl, $R_2$ and $R_3$ are methyl, $R_4$ is hydrogen and $n$ is one.

9. A process according to claim 1 wherein R is hydrogen, $R_1$ is (4-phenylamino)phenyl, $R_2$ and $R_3$ taken together with the carbon to which they are attached is cyclohexyl, $R_4$ is hydrogen and $n$ is one.

References Cited

UNITED STATES PATENTS

| | | | |
|---|---|---|---|
| 2,891,924 | 6/1959 | Doak | 260—41.5 |
| 2,971,038 | 2/1961 | A'Amico | 260—788 |

JOSEPH L. SCHOFER, Primary Examiner

C. A. HENDERSON, JR., Assistant Examiner

U.S. Cl. X.R.

260—41.5, 45.9 R, 239 B, 239 BA, 247, 293.4 E, 306.6 A, 785, 786, 788, 809